(12) United States Patent
Shepston (10) Patent No.: US 12,536,359 B2
(45) Date of Patent: Jan. 27, 2026

(54) DECOUPLING CAPACITOR PARAMETER DETERMINATION FOR A POWER DISTRIBUTION NETWORK

(71) Applicant: XILINX, INC., San Jose, CA (US)

(72) Inventor: Shad Shepston, Broomfield, CO (US)

(73) Assignee: XILINX, INC., San Jose, CA (US)

( * ) Notice: Subject to any disclaimer, the term of this patent is extended or adjusted under 35 U.S.C. 154(b) by 684 days.

(21) Appl. No.: 17/958,249

(22) Filed: Sep. 30, 2022

(65) Prior Publication Data
US 2024/0119208 A1    Apr. 11, 2024

(51) Int. Cl.
*G06F 30/367*     (2020.01)
*G06F 119/06*     (2020.01)

(52) U.S. Cl.
CPC ........ *G06F 30/367* (2020.01); *G06F 2119/06* (2020.01)

(58) Field of Classification Search
USPC .......................................... 716/109
See application file for complete search history.

(56) References Cited

U.S. PATENT DOCUMENTS

| | | | |
|---|---|---|---|
| 8,412,497 B1* | 4/2013 | Alexander | G06F 30/367 703/2 |
| 9,659,127 B2* | 5/2017 | Jung | H01L 25/16 |
| 9,805,157 B1* | 10/2017 | Rinck | G06F 30/398 |
| 2019/0370425 A1* | 12/2019 | Chhabra | H10D 1/68 |
| 2024/0119208 A1* | 4/2024 | Shepston | G06F 30/367 |

FOREIGN PATENT DOCUMENTS

| | | | | |
|---|---|---|---|---|
| CN | 111898331 A | * | 11/2020 | G06F 30/39 |
| KR | 20140030717 A | * | 3/2014 | G06F 30/367 |

* cited by examiner

*Primary Examiner* — Mohammed Alam
(74) *Attorney, Agent, or Firm* — Patterson + Sheridan, LLP (57) ABSTRACT

A circuit analysis system performs a method for analyzing a power distribution network by determining a first S-parameter model for a first circuit element of the power distribution network. The first circuit element includes first ports that are coupled to first decoupling capacitors. Each of the first decoupling capacitors is associated with a respective first decoupling capacitor S-parameter model. The first S-parameter model is combined with one or more of the first decoupling capacitor S-parameter models to generate a combined S-parameter model for the power distribution network. Further, an impedance profile for the power distribution network is determined based on the combined S-parameter model.

17 Claims, 8 Drawing Sheets

DECOUPLING CAPACITOR PARAMETER DETERMINATION FOR A POWER DISTRIBUTION NETWORK

TECHNICAL FIELD

Examples of the present disclosure generally relate to a power distribution network, and, in more particular to, determining the decoupling capacitor parameters for a power distribution network.

BACKGROUND

A power distribution network (PDN) includes the elements of a semiconductor device that provide power supply signals from a power supply device to the integrated circuit (IC) device of devices. In one instance, a PDN includes a power supply device, a circuit board, a package substrate, and an IC device. Further, the PDN includes decoupling capacitors disposed on the circuit board, on the package substrate, and/or with the IC device. The type, location, size, and number of decoupling capacitors is selected to ensure that adequate voltage and current is provided from the power supply device to the IC device via the PDN. In many instances, the PDN is analyzed to determine whether or not the voltage and current provided by the PDN satisfies the parameters of the IC device of the PDN.

During the design of a semiconductor device, type, location, size, and/or number of decoupling capacitors are varied to identify a set of decoupling capacitor parameters that provide PDN that satisfies the parameters of the IC device the PDN, and satisfies a manufacturing cost constraint of the corresponding electron device. However, each time a decoupling capacitor parameter is changed, full simulation of the PDN is performed to analyze the PDN. Accordingly, current methods for analyzing a PDN are processing time and processing power intensive, increasing the processing time and processing power used during the design of the corresponding semiconductor devices, and increasing the corresponding manufacturing costs of the corresponding semiconductor devices.

Thus, there is a need for improved methods for analyzing PDNs to reduce manufacturing costs of the corresponding semiconductor devices.

SUMMARY

In one example, a method for analyzing a power distribution network includes determining a first S-parameter model for a first circuit element of the power distribution network. The first circuit element includes first ports. The first ports are coupled to first decoupling capacitors. Each of the first decoupling capacitors is associated with a respective first decoupling capacitor S-parameter model. The method further comprises determining, by combining the first S-parameter model with one or more of the first decoupling capacitor S-parameter models, a combined S-parameter model for the power distribution network. Further, the method comprises determining an impedance profile for the power distribution network based on the combined S-parameter model.

In one example, a circuit analysis system includes a memory storing instructions, and a processor. The processor is coupled to the memory and executes the instructions to cause the processor to determine a first S-parameter model for a first circuit element of a power distribution network. The first circuit element includes first ports. The first ports are coupled to first decoupling capacitors. Each of the first decoupling capacitors is associated with a respective first decoupling capacitor S-parameter model. The processor further executes the instructions to determine, by combining the first S-parameter model with one or more of the first decoupling capacitor S-parameter models, a combined S-parameter model for the power distribution network. Further, the processor executes the instructions to determine an impedance profile for the power distribution network based on the combined S-parameter model.

In one example, a non-transitory computer readable medium includes stored instructions, which when executed by a processor, cause the processor to determine a first S-parameter model for a first circuit element of a power distribution network. The first circuit element includes first ports. The first ports are coupled to first decoupling capacitors. Each of the first decoupling capacitors is associated with a respective first decoupling capacitor S-parameter model. Further, the processor determines, by combining the first S-parameter model with one or more of the first decoupling capacitor S-parameter models, a combined S-parameter model for the power distribution network. The processor further determines an impedance profile for the power distribution network based on the combined S-parameter model.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

A power distribution network (PDN) includes a power supply (e.g., voltage regulator) and a target (e.g., driven) integrated circuit (IC) device(s) of a semiconductor device and all elements of the semiconductor device between the power supply and the target IC device. In one example, the PDN includes decoupling capacitors that are disposed on one or more of a circuit board, a package substrate, and an IC device. The performance of the PDN is altered by varying the parameters of the decoupling capacitors. The parameters of the decoupling capacitors include the number of decoupling capacitors, the location of the decoupling capacitors, the type of decoupling capacitors, and the size (e.g., capacitance value) of the decoupling capacitors.

In one or more examples, a PDN is analyzed to determine whether or not the voltage and current parameters of the corresponding IC device are satisfied. However, current methods for analyzing a PDN are processing time and processing resources intensive, increasing the manufacturing cost of the corresponding semiconductor device. In the following, an improved method for analyzing a PDN is described. The method described herein u less processing time and processing resource intensive than previously relied upon methods for analyzing a PDN. For example, the method described herein generates S-parameter models for the elements of the PDN. The use of S-parameter models reduces the processing time and processing resources used to analyzing a PDN, decreasing the manufacturing cost of the corresponding semiconductor device. The method described herein is able to analyze a PDN thousands of times faster than previous methods that do not use S-parameter models.

Figure 1:
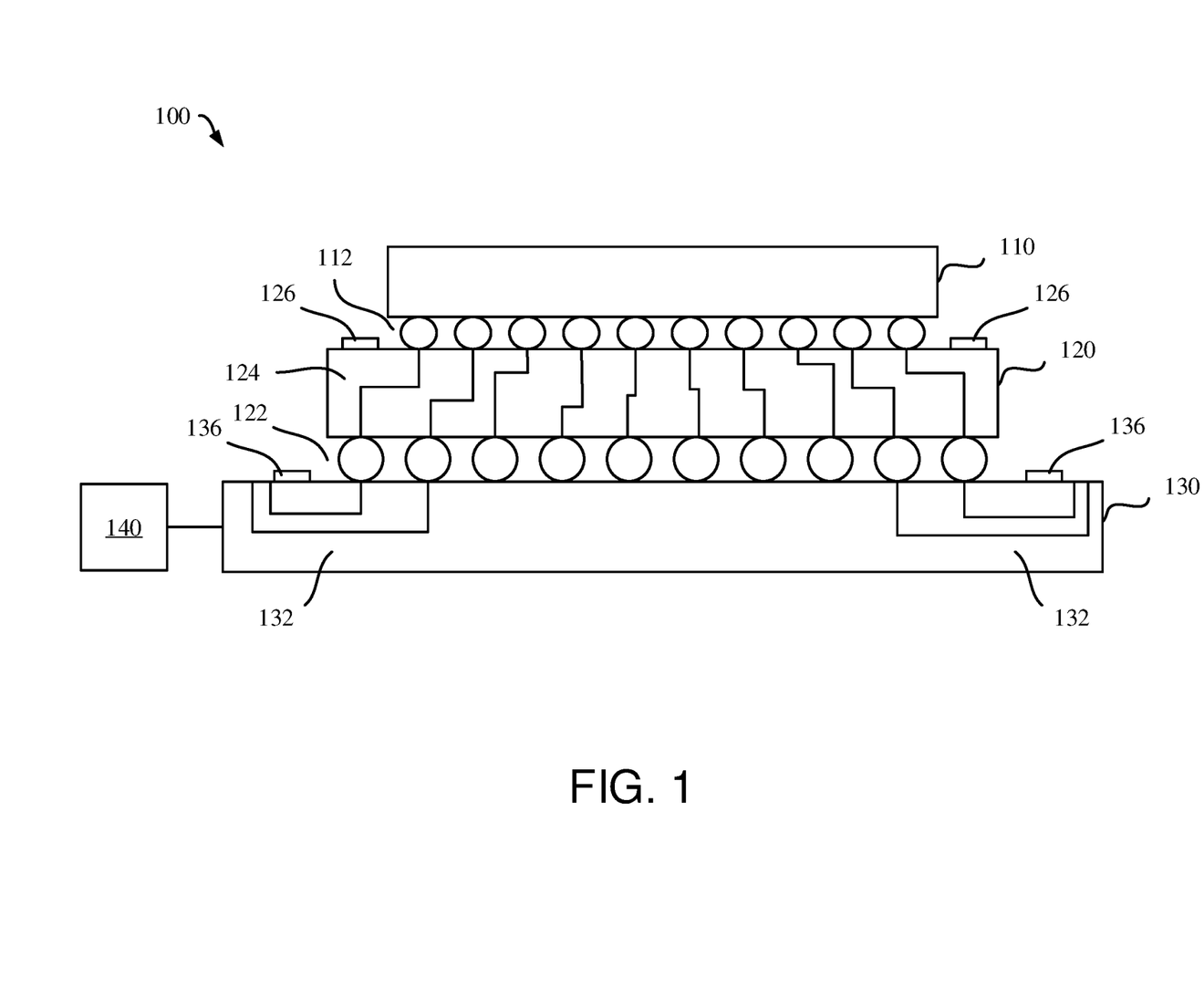
FIG. 1 illustrates a block diagram of a semiconductor device, according to some examples.

FIG. 1 illustrates a semiconductor device 100, according to one or more examples. The semiconductor device 100 includes an integrated circuit (IC) device 110, a package substrate 120, and a circuit board 130. The IC device 110 is mounted to the package substrate 120 via one or more connection elements 112 (e.g., bump pads or sockets). The package substrate 120 is mounted to the circuit board 130 via one or more connection elements 122.

The IC device 110 is an IC chip and/or IC package. In one example, the IC device 110 is a logic device such as a field programmable gate array (FPGA) or application specific IC (ASIC), among others. While FIG. 1 illustrates a single IC device 110, in other examples, multiple IC devices 110 may be included in the semiconductor device 100. The multiple IC devices may be vertically stacked and/or horizontally disposed on the package substrate 120.

The package substrate 120 is an interconnection device, such as an interposer or another routing substrate. The package substrate 120 includes one or more conductive and non-conductive layers. In one or more examples, the package substrate 120 includes one or more organic and/or silicon materials, among others. The package substrate 120 includes traces 124 (e.g., interconnection wires) formed within the layers of the package substrate 120 that connect the IC device 110 with the circuit board 130. The package substrate 120 further includes decoupling capacitors 126. The decoupling capacitors 126 are mounted to the package substrate 120.

The circuit board 130 is a printed circuit board (PCB). The circuit board 130 includes a plurality of layers. Further, the circuit board 130 includes traces 132 formed within the layers of the circuit board 130, and that connect the IC device 110 to an external device or devices. The circuit board 130 connects the IC device 110 with a semiconductor device external to the IC device 110. Further, the circuit board 130 may be mounted within an electronic system. The circuit board 130 further includes decoupling capacitors 136. The decoupling capacitors 136 are mounted to the circuit board 130.

The semiconductor device 100 further includes circuit element 140. The circuit element 140 provides one or more voltage signals to the IC device 110 via connections within the circuit board 130 and the package substrate 120. In one example, the circuit element 140 is voltage regulator circuitry. The circuit element 140 may be mounted on the circuit board 130 or external to the circuit board 130.

In one or more examples, the semiconductor device 100 includes a PDN that includes the circuit element 140 (e.g., voltage regulator circuitry), the circuit board 130, one or more of the traces 132, the package substrate 120, one or more of the connection elements 122, one or more of the traces 124, one or more of the connection elements 112, and the IC device 110. Further, the PDN further includes the decoupling capacitors 126 and the decoupling capacitors 136. The decoupling capacitors 126 and 136 mitigate noise (e.g., interference) within the PDN. For example, the decoupling capacitors 126 mitigate the effects of voltage drop within the PDN and voltage spikes within the PDN. The PDN also includes bulk capacitances within the IC device 110.

Figure 2:
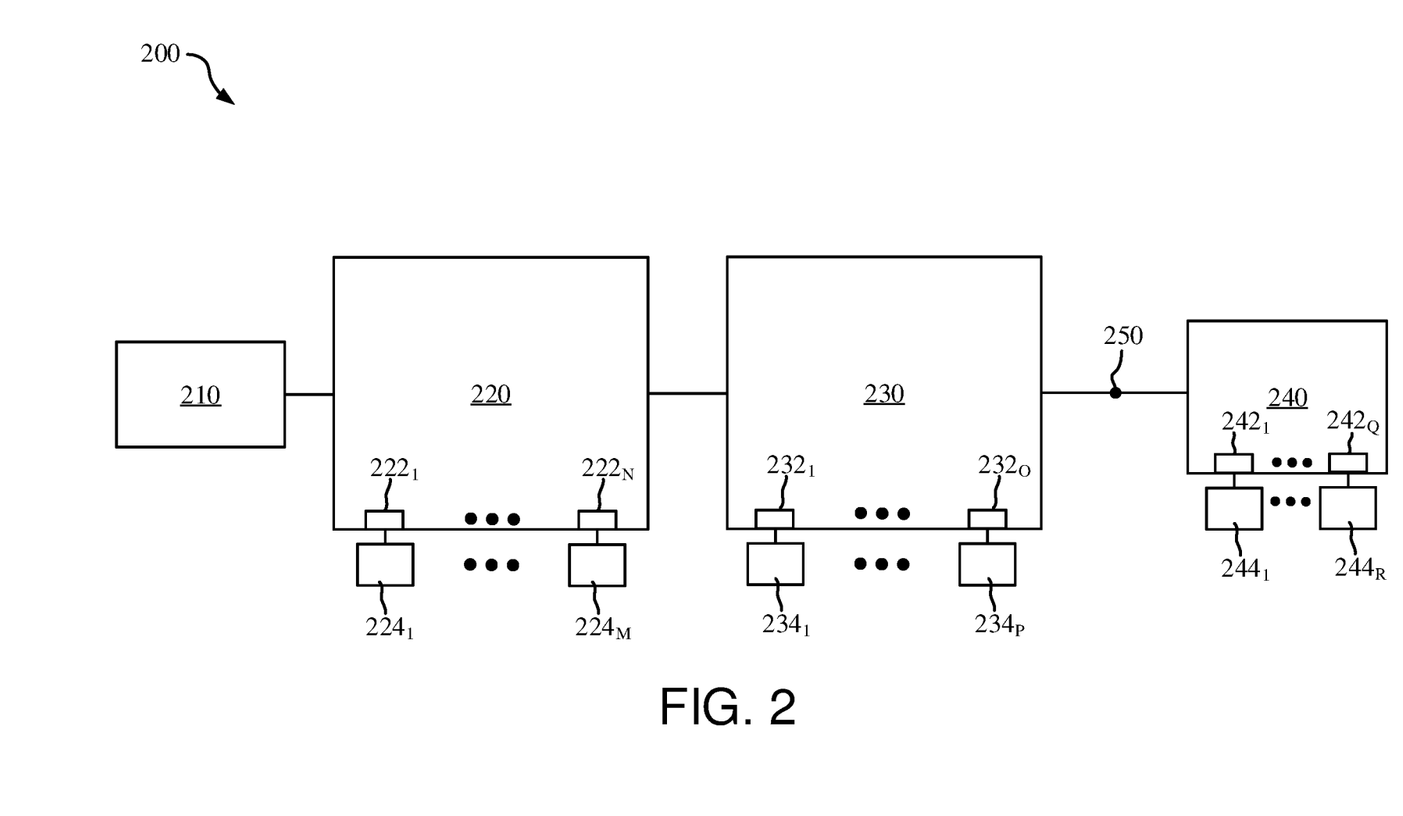
FIG. 2 illustrates a block diagram of a power distribution network (PDN), according to some examples.

FIG. 2 illustrates a schematic diagram of a PDN 200, according to one or more examples. The PDN 200 includes second circuit element 210, a circuit board 220, a package substrate 230, and an IC device 240. The second circuit element 210 is configured similar to the circuit element 140 of FIG. 1.

The circuit board 220 is configured similar to the circuit board 130 of FIG. 1. The circuit board 220 includes ports $222_1$-$222_N$. N is more than 1. One or more decoupling capacitors $224_1$-$224_M$ are connected to the ports 222. M is more than 1. Further, M is less than or equal to N. The second circuit element 210 is connected to the circuit board 220. The decoupling capacitors 224 are configured similar to the decoupling capacitors 136 of FIG. 1.

The package substrate 230 is configured similar to the package substrate 120 of FIG. 1. The package substrate 230 includes ports $232_1$-$232_O$. O is more than 1. One or more decoupling capacitors $224_1$-$224_P$ are connected to the ports 222. P is more than 1. Further, P is less than or equal to O. The decoupling capacitors 234 are configured similar to the decoupling capacitors 126 of FIG. 1. The package substrate 230 is connected to the circuit board 220. For example, as illustrated by FIG. 1, the package substrate 230 is mounted to the circuit board 220 via one or more connection elements (e.g., connection elements 112 of FIG. 1).

The IC device 240 is configured similar to the IC device 110 of FIG. 1. The IC device 240 includes lumped capacitances $244_1$-$224_R$ positioned at ports $242_1$-$242_Q$. R is one or more, and Q is one or more. R is less than or equal to Q. Each of the lumped capacitances 244 corresponds to the capacitance at each of the respective ports 242. In one example, the port 250 may be used to analyze the voltage at the IC device 240.

Figure 3:
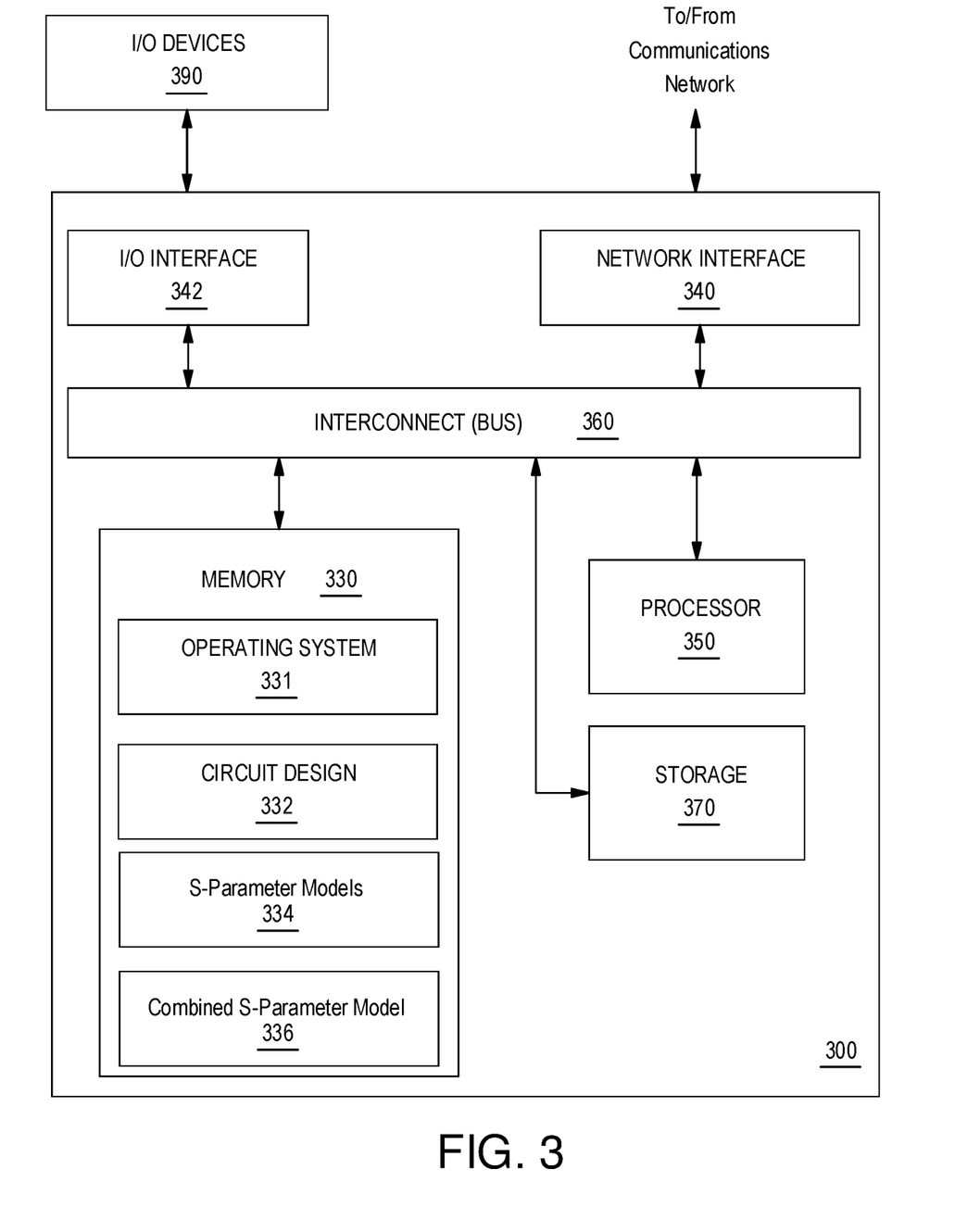
FIG. 3 illustrates a block diagram of a circuit analysis system, according to some examples.

In one or more examples, the PDN 200 is analyzed to ensure that voltage and current provided to the IC device 240 satisfies the parameters of the IC device 240, ensuring that the IC device 240 functions properly. FIG. 3 illustrates a block diagram a circuit analysis system 300, according to one or more examples. The circuit analysis system 300 analyses a PDN (e.g., the PDN 200 of FIG. 2) to ensure that the parameters of the corresponding IC device (e.g., the IC device 240) are satisfied. For example, the circuit analysis system 300 uses S-parameter models of the elements of the PDN to determine whether or not the parameters of the corresponding IC device are satisfied. With reference to FIG. 2, the circuit system 300 uses the S-parameter models of the circuit board 220, the package substrate 230, the IC device 240, decoupling capacitors 224, 234, and lumped capacitances 244 in the determination as to whether or not the parameters of the corresponding IC device are satisfied.

The circuit analysis system 300 analyzes the PDN 200 based on the material properties (e.g., dielectric properties and metal properties, among others) to generate S-parameter models for the circuit board 220, the package substrate 230, and the IC device 240. The S-parameter models include ports 222, 232, and 242, respectively. Further, the circuit analysis system 300 generates S-parameter models for the capacitors 224, 234, and lumped capacitances 244. Further, the circuit analysis system 300 populates or un-populates the ports 222, 232, and 242 based on which of the decoupling capacitors 224, 234, and lumped capacitances 244 are included within the corresponding circuit design. The S-parameter models of the included decoupling capacitors 224, 234, and lumped capacitances 244 are cascaded (e.g., combined) with the corresponding S-parameter model of the circuit board 220, the package substrate 230, and the IC device 240 to analyze the PDN 200.

S-parameters are S-matrix or scattering parameters. S-parameters represent linear characteristics of circuit elements. S-parameters can be used to calculate characteristics of the PDN including gain, loss, impedance, phase group delay, and voltage standing wave ratio, among others. S-parameters use matched loads to characterize circuit elements. In one example, S-parameters can be represented in a matrix (model) form that describes a PDN element with ports. Ports are the points at which electrical signals either enter or exit the PDN element.

In one example, an S-parameter model (matrix) describes an N-port PDN element. Such a matrix is square, and contains $N^2$ matrix elements or S-parameters. Each S-parameter is represented by a unitless complex number that represents amplitude and phase. The complex number is represented in rectangular form, or polar form. The S-parameter magnitude is expressed in linear form or logarithmic form. The S-parameter angle is represented in degrees or radians.

In one example, when specifying a set of S-parameters, the frequency of a driven signal, the nominal impedance, the allocation of port numbers, and operating parameters (e.g., temperature, control voltage, and bias current, among others) are defined. Further, the S-parameter models for a PDN element is defined in terms of incident waves ($a_i$) and reflected power waves ($b_i$). Incident waves are the waves travel toward a port and reflected power waves are waves travelling away from the port. The relationship between vectors a and b, whose i-th components are the power waves ($a_i$) and reflected power waves ($b_i$), is represented using the S-parameter matrix S:

$$b = Sa \qquad \text{Equation 1.}$$

The S-parameter model is defined in terms of incident waves ($a_i$) and reflected power waves ($b_i$) for ports 1-T, is represented by the matrix:

$$\begin{pmatrix} b_1 \\ \vdots \\ b_T \end{pmatrix} = \begin{pmatrix} S_{11} & \cdots & S_{1N} \\ \vdots & \ddots & \vdots \\ S_{T1} & \cdots & S_{NN} \end{pmatrix} \begin{pmatrix} a_1 \\ \vdots \\ a_T \end{pmatrix} \qquad \text{Equation 2}$$

As is illustrated by the equation 2, $b_1 = S_{11}a_1 + \ldots S_{1N}a_T$, and $b_T = S_{T1}a_1 + \ldots + S_{NN}a_T$. The equations for $b_1$ and $b_T$ provide the relationship between the reflected and incident power waves at each of the ports 1-T. In one example, each port has an input and output. In such an example, $a_1$-$a_T$ corresponds to inputs of the ports 1-T. Further, $b_1$-$b_T$ corresponds to outputs of the ports 1-T. The coefficient $S_{11}$ is the input voltage coefficient, $S_{1N}$ is the reverse voltage gain, $S_{T1}$ is the forward voltage gain, and the $S_{NN}$ is the output voltage reflection coefficient.

With reference to FIG. 2, the circuit board 220, the capacitors 224, the package substrate 230, the capacitors 234, the IC device 240, and the lumped capacitances 244 are modeled using S-parameters. As is described with further reference to the method 400 of FIG. 4, S-parameter models are used by the circuit analysis system 300 to measure the performance of a PDN under a load condition corresponding to the number, type, location, and/or size of the decoupling capacitors within the PDN.

FIG. 3 illustrates a circuit analysis system 300 according to one or more examples. As shown, the circuit analysis system 300 includes, without limitation, a computer processor 350 (e.g., a central processing unit), a network interface 340, and memory 330. The circuit analysis system 300 may also include an input/output (I/O) device interface 342 connecting I/O devices 390 (e.g., keyboard, display and mouse devices) to the circuit analysis system 300.

The circuit analysis system 300 may be connected (e.g., networked) to other machines (or systems) in a local area network (LAN), an intranet, an extranet, and/or the Internet. The circuit analysis system 300 may operate in the capacity of a server or a client machine in client-server network environment, as a peer machine in a peer-to-peer (or distributed) network environment, or as a server or a client machine in a cloud computing infrastructure or environment.

In one or more examples, the circuit analysis system 300 may be a personal computer (PC), a mobile computing device (e.g., tablet or a mobile phone device), or any computer system capable of executing a set of instructions (sequential or otherwise) that specify actions to be taken by that computer system. Further, while a single circuit analysis system 300 is illustrated, in other examples, the circuit analysis system 300 includes any collection of machines that individually or jointly execute a set (or multiple sets) of instructions to perform any one or more of the methodologies discussed herein.

In one or more examples, the computer processor 350 retrieves and executes programming instructions stored in the memory 330 (e.g., a non-transitory computer readable medium). Similarly, the computer processor 350 stores and retrieves application data residing in the memory 330. A bus 360 facilitates transmission, such as of programming instructions and application data, between the computer processor 350, I/O device interface 342, storage 370, network interface 340, and memory 330. The computer processor 350 is included to be representative of a single processor, multiple processors, a single processor having multiple processing cores, and the like. Further, the memory 330 and the storage 370 are generally included to be representative of volatile and non-volatile memory elements. For example, the memory 330 and the storage 370 can include random access memory and a disk drive storage device. Although shown as a single unit, the memory 330 or the storage 370 may be a combination of fixed and/or removable storage devices, such as magnetic disk drives, flash drives, removable memory cards or optical storage, network attached storage (NAS), or a storage area-network (SAN). The storage 370 may include both local storage devices and remote storage devices accessible via the network interface 340.

As shown, the memory 330 includes an operating system 331. The operating system 331 may facilitate receiving input from and providing output to various components. The operating system 331 includes a user interface that displays information pertaining to a PDN within a display device. Further, the user interface may include one or more input elements that receive input from a user. For example, the operating system includes one or more sliders for selecting a number of the decoupling capacitors 224, 234, and/or the type of the capacitors 224,234. Further, as is described in further detail in the following, the user interface displays one or more impedance profiles determined for a PDN. The user interface also displays manufacturing costs for the PDN. For example, the network interface 340 can be used to transmit and/or receive a circuit design.

Figure 4:
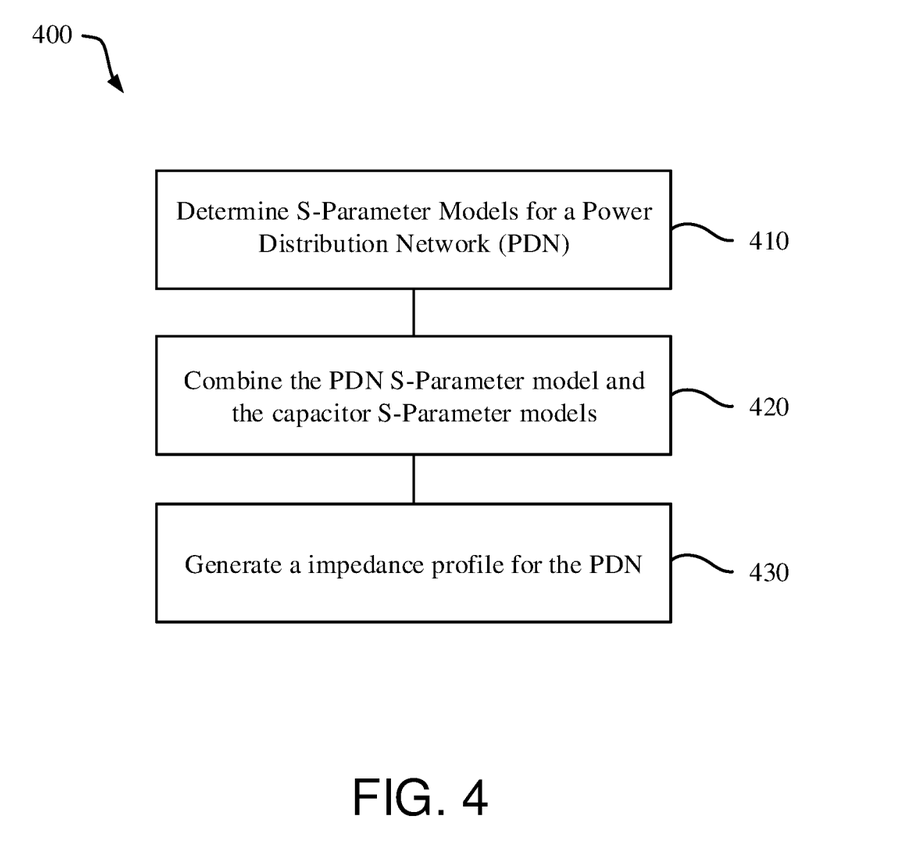
FIG. 4 illustrates a flowchart of a method for analyzing a PDN, according to some examples.

FIG. 4 illustrates a flowchart of a method 400 for analyzing a PDN (e.g., the PDN 200 of FIG. 2). The method 400 is performed by the circuit analysis system 300 of FIG. 3. For example, the processor 350 of the circuit analysis system 300 executes instructions stored in the memory 330 to perform the method 400. The method 400 is described with regard to FIG. 2.

At 410 of the method 400, an S-parameter model is determined for the PDN 200. For example, the circuit analysis system 300 determines an S-parameter model for the PDN 200. In one example, the PDN 200 is associated with the semiconductor system design 332 stored in the memory 330. In such an example, the circuit analysis system 300 obtains the semiconductor system design 332 from the memory 330, and determines an S-parameter model for the PDN 200. Determining the S-parameter model for the PDN 200 includes determining the S-parameter model for the circuit board 220, the package substrate 230, and the IC device 240. Further, determining the S-parameter for the PDN 200 model includes determining, or obtaining, the S-parameter model for each of the decoupling capacitors 224, 234, and the lumped capacitances 244.

In one example, the S-parameter model for the circuit board 220 are determined by simulating (e.g., analyzing) the performance of the circuit board 220 based on the properties (e.g., dielectric properties and metal properties, among other). In one example, the circuit analysis system 300 injects a simulated stimulus (e.g., signal) in to the circuit board 220 and measures the reflected signal to an input of the circuit board 220 and the signal that travels through to an output of the circuit board 220 using a reference load for the ports of the circuit board. The reflected signal and the measured signal are used to determine the S-parameter model for the circuit board 220. The S-parameter model for the package substrate 230 and the IC device 240 are determined similar to as described above with regard to the circuit board 220. Further, the S-parameter models for the decoupling capacitors 224 and 234 and lumped capacitance models 244 are determined similar to as described with regard to the circuit board 220. The S-parameter models for the PDN 200 are stored as the S-parameter models 334 in the memory 330.

At 420 of the method 400, the S-parameter models 334 of the PDN 200 are combined. For example, the circuit analysis system 300 cascades the S-parameter models for the circuit board 220, the package substrate 230, the IC device 240, the decoupling capacitors 224, 234, and lumped capacitances 244 each other. Cascading the S-parameter models 334 combines the S-parameter models using transfer matrices to generate a combined S-parameter model (e.g., combined S-parameter matrix).

In one example, cascading the S-parameter models 334 includes determining which of the ports 222, and 232 are coupled to a respective decoupling capacitor 224 and 234, and which of the ports 222 and 232 are decoupled from a respective decoupling capacitor 224 and 234. In one example, cascading the S-parameter models 334 includes cascading the S-parameter model associated with each decoupling capacitor 224 and 234 that is coupled to a one of the ports 222 and 234. The S-parameter models of the capacitors 224 coupled to the ports 222 are cascaded with the S-parameter model of the circuit board 220. The S-parameter models of the capacitors 234 coupled to the ports 232 are cascaded with the S-parameter model of the package substrate 230.

In one example, the ports 222 and 232 that are not coupled to a respective capacitor are terminated with an open. The S-parameter models of the ports 222 and 232 that are not coupled to a respective capacitor are omitted and not cascaded.

The S-parameter models for the circuit board 220, the package substrate 230, and the IC device 240 are then cascaded (e.g., combined) to generate a combined S-parameter model 336. The S-parameter model of the IC device 240 is cascaded with the S-parameter model of the lump capacitances 244 before being cascaded with the S-parameter models for the circuit board 220 and the package substrate 230. The combined S-parameter model 336 is stored in the memory 330. In one example, all ports 222, 232, and 242 are cascaded. Further, in one or more examples, an observation port 250 is maintained between the package substrate 230 and the IC device 240.

At 430 of the method 400, the impedance profile for the PDN 200 is generated. For example, the circuit analysis system 300 determines the impedance profile for the PDN 200 from the combined S-parameter model 336. The impedance profile for the PDN 200 may be plotted as the impedance vs frequency. In other examples, the circuit analysis system 300 determines manufacturing cost information for the DPN based on the combined S-parameter model 336.

Figure 5:
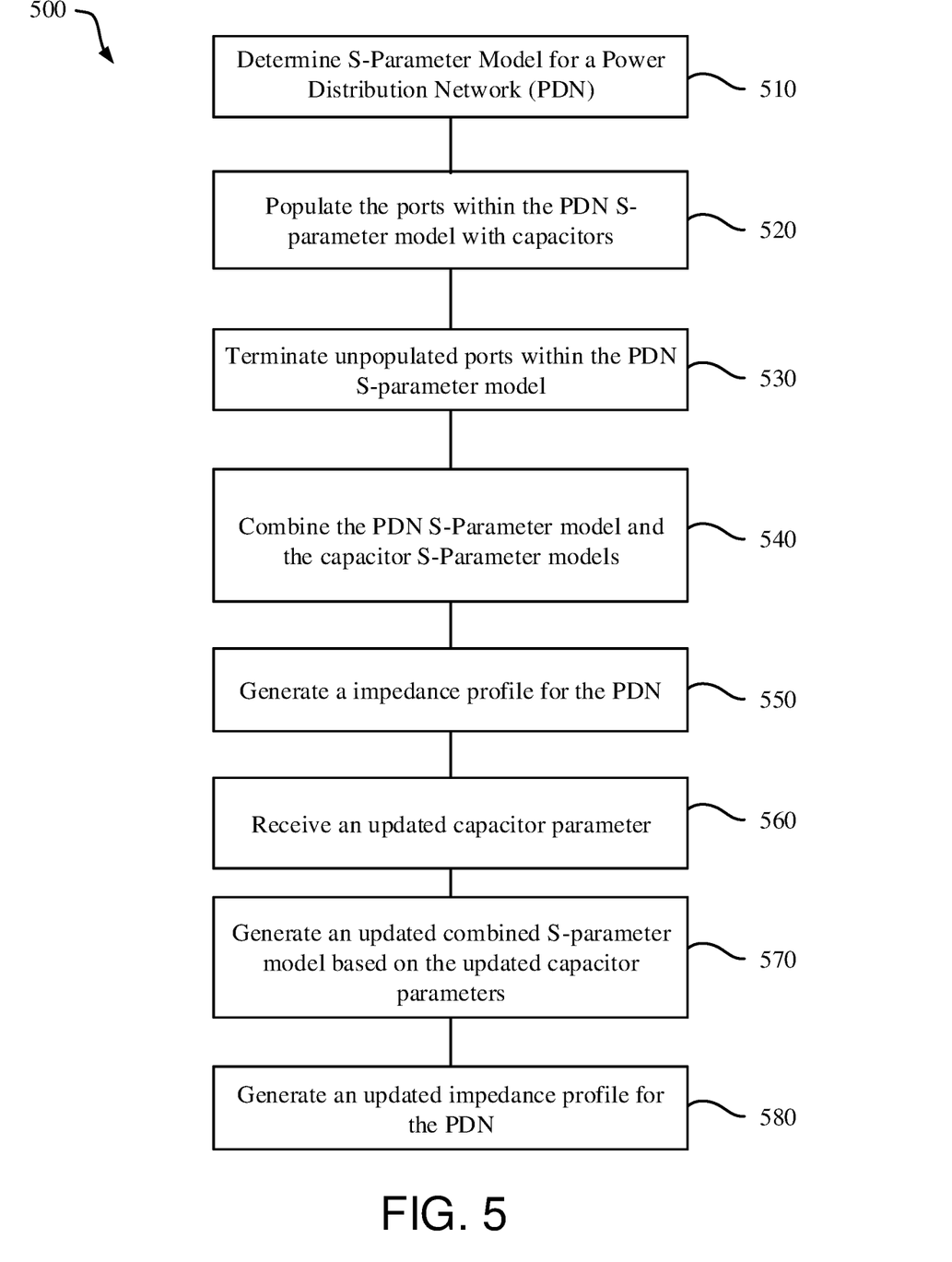
FIG. 5 illustrates a flowchart of a method for analyzing a PDN, according to some examples.

FIG. 5 illustrates a flowchart of a method 500 for analyzing a PDN (e.g., the PDN 200 of FIG. 2) according to one or more examples. The method 500 is performed by the circuit analysis system 300 of FIG. 3. For example, the processor 350 of the circuit analysis system 300 executes instructions stored in the memory 330 to perform the method 500. Further, the method 500 is described with regard to FIG. 2.

At 510 of the method 500, S-parameter models of a PDN (e.g., the PDN 200 of FIG. 2) are determined. The method 510 corresponds to the 410 of the method 400. At 520 of the method 500, ports within the S-parameter models are populated with capacitors. For example, one or more of the ports 222 are populated with capacitors 224, one or more of the ports 232 are populated with the capacitors 234, and one or more of the ports (e.g., positions) 242 are populated with the lump capacitances 244. At 530 of the method 500, the unpopulated ports 222, 232, and/or 242 are placed in an open state (e.g., the ports are terminated with an open).

Figure 6:
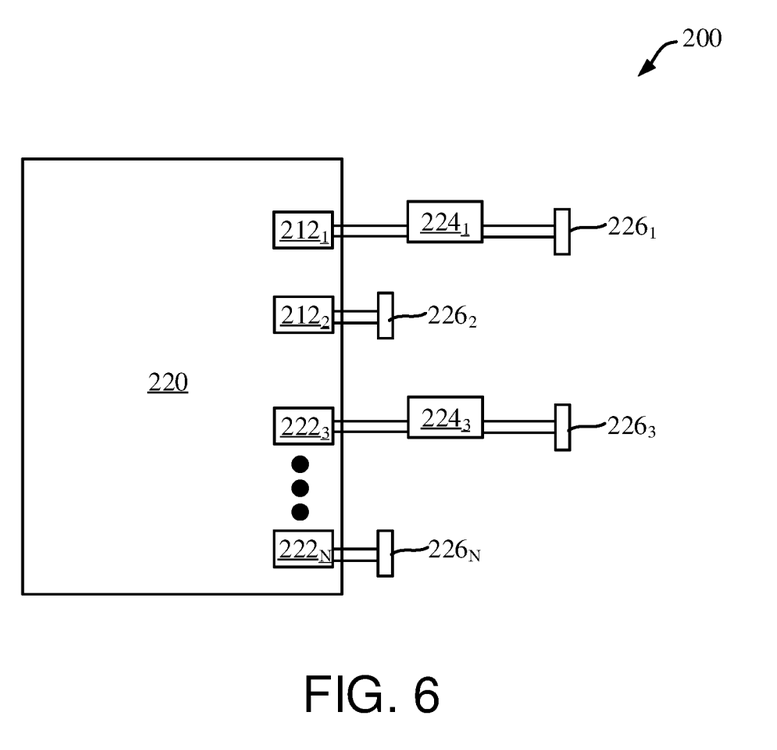
FIG. 6 illustrates a block diagram of a portion of a PDN, according to some examples.

FIG. 6 illustrates a portion of the PDN 200 including the circuit board 220. As illustrated, the ports $222_2$ and $222_N$ are terminated with an open (e.g., open $226_2$ and $226_N$) as neither of the ports $222_2$ and $222_N$ are coupled with a capacitor. The ports $222_1$ and $222_3$ are coupled with a decoupling capacitor $224_1$ and $224_3$, and terminated with a short $226_1$ and $226_3$. Accordingly, the S-parameter models of the capacitors $224_1$ and $224_3$ are cascaded with the S-parameter model of the circuit board 220, to generate the combined S-parameter model 336.

At 540 of the method 500, the PDN S-parameter models and the capacitor S-parameter models are combined to generate a combined S-parameter model. 540 of the method 500 corresponds to 420 of the method 400.

At 550 of the method 500, an impedance profile for the PDN (e.g., the PDN 200) is generated from the combined S-parameter model. 550 of the method 500 corresponds to 430 of the method 400. Further, manufacturing cost information of the PDN may be determined. The manufacturing cost information corresponds to the number of decoupling capacitors 224 and 234, and the type of decoupling capacitors 224 and 234.

At 560 of the method 500, updated capacitor parameters are received. For example, updated parameters for the decoupling capacitors 224, 234, and/or lump (or bulk) capacitances 244 are received. The parameters correspond to the type of capacitor, size of capacitor, and/or number of capacitors coupled to the ports 222, 232, and 242. In one example, the type of capacitor corresponds to ceramic, tantalum, and aluminum electrolytic capacitors, among others. Further, the size of capacitor corresponds to the capacitance value of the capacitors. The capacitance values may be in a range of about 2 µf to about 300 82 f, or greater. Further, the number of capacitors corresponds to the number of decoupling capacitors 224, 234 that are coupled to the respective ports 222, 232.

Each of the decoupling capacitors 224 has a common capacitance value. Each of the capacitors 234 has a common capacitance value. Further, two or more of the decoupling capacitors 224, 234 has as common capacitance value. In one example, the capacitance value of each of the decoupling capacitors 224, 234 differs from each other. Different capacitance values may be applied to two or more of the decoupling capacitors 224, 234. In one example, each of the decoupling capacitors 224, 234 are updated to have the same capacitance value. In other examples, different capacitance values may be applied to two or more of the decoupling capacitors 224, 234.

In one example, the operating system 331 of the circuit analysis system 300 includes a user interface that includes one or more slider inputs or selectable input elements for selecting different capacitance values for the decoupling capacitors 224, 234, and/or different capacitor types. For example, the user interface of the operating system 331 may include slider input or selectable input element for each of the decoupling capacitors 224, 234.

In one example, the user interface of the operating system 331 of the circuit analysis system 300 includes one or more slider inputs or selectable input elements for selecting a number of decoupling capacitors that are coupled to the ports 222, 232, respectively. For example, the user interface of the operating system 331 may include slider input or selectable input element for each of the decoupling capacitors 224, 234. The slider input or selectable input element may select from a range of number of capacitors between zero and N or M, respectively. Further, the user interface of the operating system 331 includes one or more selectable inputs of selecting the type of capacitor of the decoupling capacitors 224, 234.

In one or more examples, at each port 222, 232, a respective decoupling capacitor 224, 234, is coupled. The S-parameter model associated with the decoupling capacitors 224, 234, may be referred to as a base S-parameter model. Each of the base S-parameter models are combined with the respective S-parameter model of the circuit board 220, the package substrate 230, and the IC device 240. When generating an updated S-parameter model, the updated S-parameter models of the decoupling capacitors 224, 234 are generated as described above. The updated S-parameter model of the decoupling capacitors 224, 234 are combined with the respective base S-parameter model. Decoupling capacitors 224, 234 selected to be used are connected and terminated as a short, completing the corresponding circuit and coupling the decoupling capacitors 224, 234 with the respective one of the circuit board 220, and the package substrate 230. Decoupling capacitors 224, 234 not selected to be used are terminated with an open, and the decoupling capacitors 224, 234 are not included and the corresponding models are not combined with that of the respective one of the circuit board 220, and the package substrate 230.

In one example, the operating system 331 of the circuit analysis system 300 includes a selectable element for selecting a type of capacitor for the decoupling capacitors 224, 234. Each of the decoupling capacitors 224, 234 may be associated with a different selectable element. In another example, the decoupling capacitors 224, 234 have a common selectable element.

Figure 7:
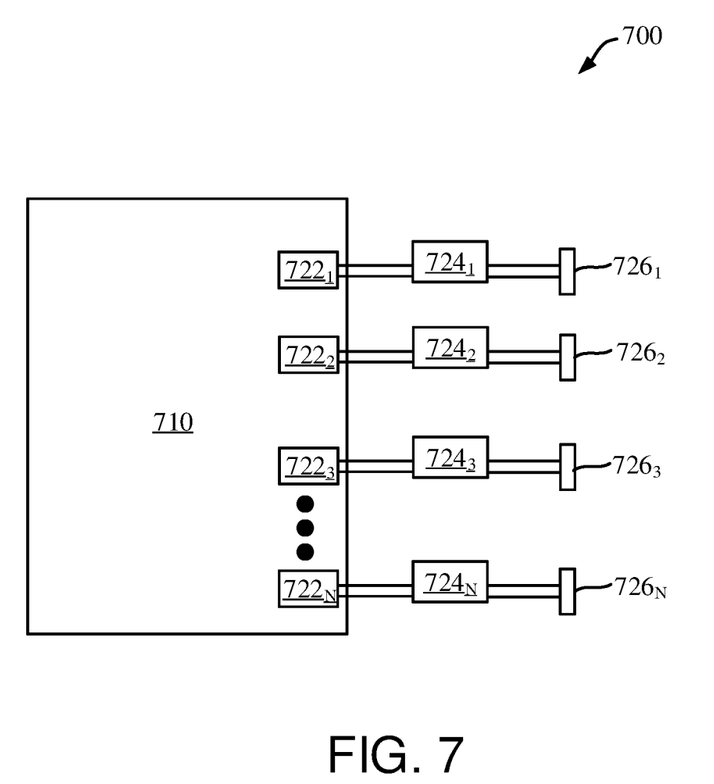
FIG. 7 illustrates a block diagram of a portion of a PDN, according to some examples.

FIG. 7 illustrates an example a circuit board 710 of a portion of a PDN 700. The circuit board 710 includes ports 722 which are coupled to decoupling capacitors 724. Each of the decoupling capacitors 724 is associated with a corresponding S-parameter model. The S-parameter model of each of the decoupling capacitors 724 is combined (e.g., cascaded) with the S-parameter model of the circuit board 710. The S-parameter model of each of the decoupling capacitors 724 is either a base model on updated model. In one example, based on a capacitor 724 being selected as described above, the respective termination port 726 is placed in a connected state. Further, based on a capacitor 724 not being selected as described above, the respected termination port 726 is configured in an open state. Placing a termination port 726 in a connected state, includes the corresponding decoupling capacitor 724 and respective S-parameter model within the combined S-parameter model. Further, placing a termination port 726 in an open state omits the corresponding decoupling capacitor 724 and respective S-parameter model from being used to generate the combined S-parameter model. For example, the termination ports $726_1$ and $726_3$ are configured in a connected state, and the S-parameter models of the decoupling capacitors $724_1$ and $724_3$ are used to generate the respective combined S-parameter model. Further, the termination ports $726_2$ and $726_N$ are configured in an open state, and the S-parameter models of the decoupling capacitors $724_2$ and $724_N$ are not included within the combined S-parameter model.

Figure 8:
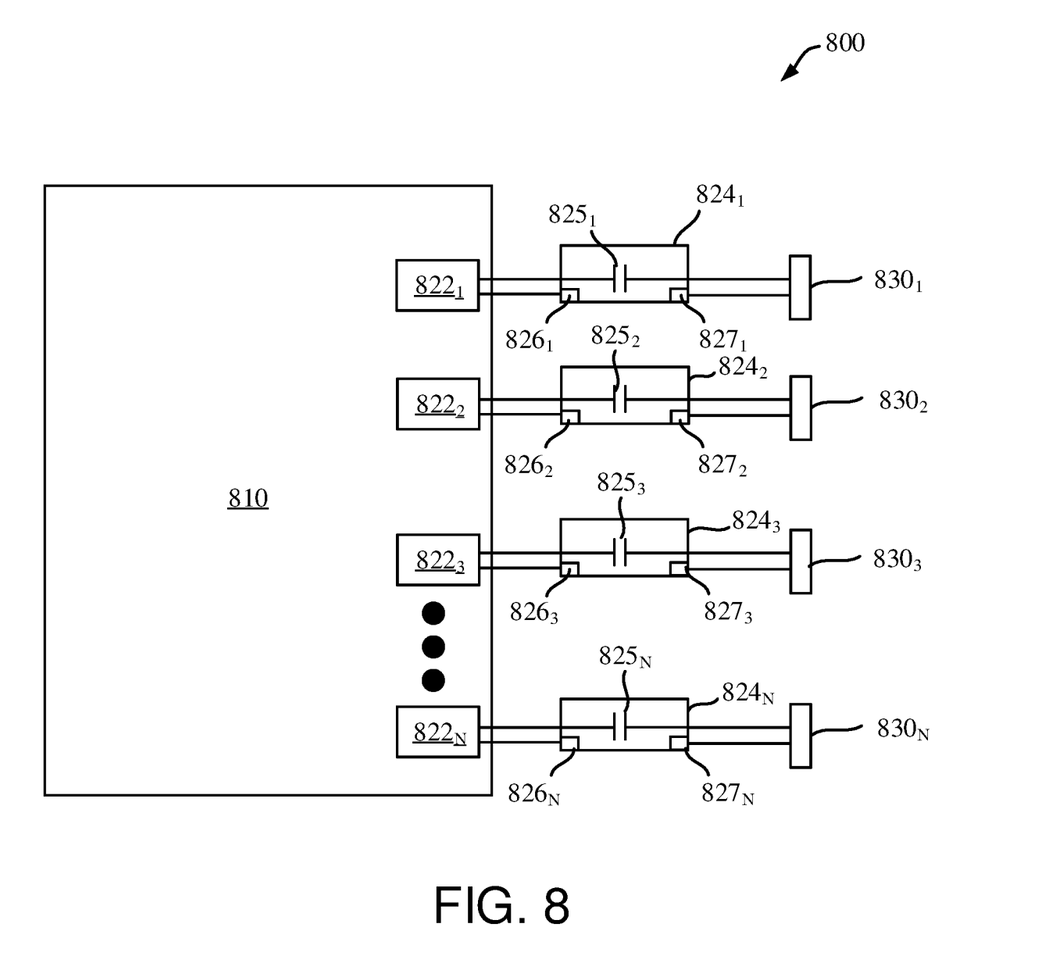
FIG. 8 illustrates a block diagram of a portion of a PDN, according to some examples.

FIG. 8 illustrates an example a circuit board 810 of a portion of a PDN 800. The circuit board 810 includes ports 822 which are coupled to decoupling capacitor models 824. Each of the decoupling capacitor models 824 is associated with a corresponding S-parameter model. The S-parameter model of each of the decoupling capacitor models 824 is combined (e.g., cascaded) with the S-parameter model of the circuit board 810, based on whether or not the termination port 830 terminates, e.g., completes the circuit, or is open, and decouples the capacitor 825 of the decoupling capacitor 824 from the corresponding port 822. In one example, each of the decoupling capacitor models 824 includes a capacitor 825, a reference node 826, and a reference node 827. The capacitor 825 and the reference node 826 of each decoupling capacitor model 824 is connected to a corresponding port 822. Further, the capacitor 825 and the reference node 827 of each decoupling capacitor model 824 is connected a corresponding termination port 830. In one example, by leaving a termination port 830 in an open state, such that the capacitor 825 is not connected to the corresponding reference node 827, the capacitance of the capacitor 825 is not visible, e.g., does not affect, the corresponding port 822. In another example, by shorting a termination port 830, e.g., forming a connection between the capacitor 825 and corresponding the reference node 827, the capacitor 825 is visible and affects the corresponding port.

The S-parameter model for the circuit board 810 may be generated to include the S-parameter model for each of the decoupling capacitor model 824. However, the S-parameter model for the circuit board 810 is generated such that the state of each of the termination ports 830 is not defined. In such an example, based on a capacitor 825 being selected to be populated (e.g., included) the corresponding termination port 830 is set to a shorted state, and the corresponding S-parameter model includes the effects of the corresponding capacitor 825. Further, based on a capacitor 825 not being selected to be populated (e.g., omitted) the corresponding termination port 830 is set to an open state, and the corresponding S-parameter model does not include the effects of the corresponding capacitor 825.

At 570 of the method 500, an updated combined S-parameter model is generated based on the updated capacitor parameters. For example, the updated capacitor parameters received at 560 are used to generate updated S-parameter models for the decoupling capacitors 224, 234. The updated S-parameter models are combined with the S-parameter models of the circuit board 220, and the package substrate 230. For example, the updated S-parameter models of the decoupling capacitors 224 are combined with S-parameter model of the circuit board 220. The updated S-parameter models of the decoupling capacitors 234 are combined with the S-parameter model of the package substrate 230. The updated S-parameter models of the decoupling capacitors 224, 234 are combined with the S-parameter models of the circuit board 220 and the package substrate 230, as described above with regard to 540 of the method 500 to generate the updated combined S-parameter model.

At 580 of the method 500, an impedance profile for the PDN (e.g., the PDN 200) is generated from the updated combined S-parameter model as described with regard to 550 of the method 500.

In one or more examples, the circuit analysis system 300 displays the impedance profile for the PDN on a display screen of the I/O devices 390. In one or more examples, the circuit analysis system 300 generates manufacturing cost information for the PDN 200 based on the parameters of the decoupling capacitors 224, 234, and/or lumped capacitances 244. For example, the circuit analysis system 300 determines the manufacturing cost information based on the capacitor type of, the included number of, and capacitance value of the decoupling capacitors 224, 234. The manufacturing costs may be displayed with the impedance profile. A user interface of the circuit analysis system 300 displays the manufacturing costs and the impedance profile within a display device. In one example, the user interface displays the manufacturing costs for different types of capacitors and/or a different number of included capacitors.

In one or more example, the circuit analysis system 300 outputs and displays multiple impedance profiles and/or manufacturing cost information for the PDN 200 determined for different capacitor parameters. As updated impedance profiles are determined as described above, one or more impedance profiles may be locked, such that newly determined impedance profiles are displayed within the user interface along with the locked impedance profiles. In one example, the user interface of the operating system 331 may include a selected input element that toggles locking an impedance profile and/or displays a baseline reference impedance profile. In one or more examples, N previous impedance profiles may be displayed in addition to the updated impedance profile. N is one or more. In such an example, the user interface of the operating system 331 includes a selected able input element that toggles displaying N previous impedance profiles. Further, the operating system 331 may include an input element that receives the value of N.

Further, manufacturing cost information may be locked such that newly determined manufacturing cost information is displayed along with the locked manufacturing cost information within the user interface. In one example, the manufacturing cost information may be locked during the method 500 such that as capacitor parameters are changed, the corresponding manufacturing cost information does not exceed the locked manufacturing cost information. In one example, the user interface of the operating system 331 may include a selected input element that toggles locking the manufacturing cost information. In one example, the number of decoupling capacitors 224, 234 may be set, or locked, such that each of the ports 222, 232 are coupled with a respective decoupling capacitor 224, 234. In such an example, the user interface of the operating system 331 includes a selectable input element that allows for indication to fully populate one or more of the ports 222, 232.

In one or more examples, the method 500 may proceed to operation 560 after the completion of the operation 580. For example, the method 500 proceeds to operation 560 based on the detection that updated capacitor parameters have been received. The loop of operations 560-580 may be repeated each time that updated capacitor parameters are received.

As is described above, S-parameter models of the elements of a PDN are used to analyze the PDN. A PDN includes decoupling capacitors. As the parameters of the decoupling capacitors are changed, updated S-parameter models are determined and use to generate an updated analysis of the PDN. The updated PDN analysis includes an updated impedance profile determined for the updated capacitor parameters. Further, the updated PDN analysis may include updated manufacturing cost information. As compared to method that do not employ S-parameter models, the method for analyzing a PDN as described herein uses less processing time and processor resources, reducing the corresponding manufacturing costs.

While the foregoing is directed to specific examples, other and further examples may be devised without departing from the basic scope thereof, and the scope thereof is determined by the claims that follow.

What is claimed is:

1. A method for analyzing a power distribution network, the method comprising:
   determining a first S-parameter model for a first circuit element of the power distribution network, the first circuit element including first ports configured to be coupled to first decoupling capacitors, wherein each of the first decoupling capacitors is associated with a respective first decoupling capacitor S-parameter model;
   determining, by combining the first S-parameter model with one or more of the first decoupling capacitor S-parameter models and a second S-parameter model for a second circuit element of the power distribution network, a combined S-parameter model for the power distribution network; and
   determining an impedance profile for the power distribution network based on the combined S-parameter model.

2. The method of claim 1 further comprising:
generating updated decoupling capacitor S-parameter models based on updated parameters received for the first decoupling capacitors;
determining an updated combined S-parameter model for the power distribution network by combining the first S-parameter model with the updated decoupling capacitor S-parameter models; and
determining an updated impedance profile for the power distribution network based on the updated combined S-parameter model.

3. The method of claim 2, wherein the updated parameters includes a type of capacitor, size of capacitor, number of capacitors, and location of the first decoupling capacitors.

4. The method of claim 1 further comprising determining the second S-parameter model for the second circuit element of the power distribution network, the second circuit element includes second ports configured to be coupled to second decoupling capacitors, wherein each of the second decoupling capacitors is associated with a respective second decoupling capacitor S-parameter model.

5. The method of claim 4, wherein the combined S-parameter model is further determined by combining the second S-parameter model with one or more of the second decoupling capacitor S-parameter models.

6. The method of claim 4, wherein the first circuit element is a circuit board of a semiconductor device and the second circuit element is a package substrate of the semiconductor device.

7. A circuit analysis system comprising:
a memory storing instructions;
a processor coupled to the memory and configured to execute the instructions to cause the processor to:
determine a first S-parameter model for a first circuit element of a power distribution network, the first circuit element including first ports configured to be coupled to first decoupling capacitors, wherein each of the first decoupling capacitors is associated with a respective first decoupling capacitor S-parameter model;
determine, by combining the first S-parameter model with one or more of the first decoupling capacitor S-parameter models and a second S-parameter model for a second circuit element of the power distribution network, a combined S-parameter model for the power distribution network; and
determine an impedance profile for the power distribution network based on the combined S-parameter model.

8. The circuit analysis system of claim 7, wherein the processor is further caused to:
generate updated decoupling capacitor S-parameter models based on updated parameters received for the first decoupling capacitors;
determine an updated combined S-parameter model for the power distribution network by combining the first S-parameter model with the updated decoupling capacitor S-parameter models; and
determine an updated impedance profile for the power distribution network based on the updated combined S-parameter model.

9. The circuit analysis system of claim 8, wherein the updated parameters includes a type of capacitor, size of capacitor, number of capacitors, and location of the first decoupling capacitors.

10. The circuit analysis system of claim 7, wherein the processor is further caused to: determine the second S-parameter model for the second circuit element of the power distribution network, the second circuit element includes second ports configured to be coupled to second decoupling capacitors, wherein each of the second decoupling capacitors is associated with a respective second decoupling capacitor S-parameter model.

11. The circuit analysis system of claim 10, wherein the combined S-parameter model is further determined by combining the second S-parameter model with one or more of the second decoupling capacitor S-parameter models.

12. The circuit analysis system of claim 10, wherein the first circuit element is a circuit board of a semiconductor device and the second circuit element is a package substrate of the semiconductor device.

13. A non-transitory computer readable medium comprising stored instructions, which when executed by a processor, cause the processor to:
determine a first S-parameter model for a first circuit element of a power distribution network, the first circuit element including first ports configured to be coupled to first decoupling capacitors, wherein each of the first decoupling capacitors is associated with a respective first decoupling capacitor S-parameter model;
determine, by combining the first S-parameter model with one or more of the first decoupling capacitor S-parameter models and a second S-parameter model for a second circuit element of the power distribution network, a combined S-parameter model for the power distribution network; and
determine an impedance profile for the power distribution network based on the combined S-parameter model.

14. The non-transitory computer readable medium of claim 13, wherein the processor is further caused to:
generate updated decoupling capacitor S-parameter models based on updated parameters received for the first decoupling capacitors;
determine an updated combined S-parameter model for the power distribution network by combining the first S-parameter model with the updated decoupling capacitor S-parameter models; and
determine an updated impedance profile for the power distribution network based on the updated combined S-parameter model.

15. The non-transitory computer readable medium of claim 14, wherein the updated parameters includes a type of capacitor, size of capacitor, number of capacitors, and location of the first decoupling capacitors.

16. The non-transitory computer readable medium of claim 13, wherein the processor is further caused to: determine the second S-parameter model for the second circuit element of the power distribution network, the second circuit element includes second ports configured to be coupled to second decoupling capacitors, wherein each of the second decoupling capacitors is associated with a respective second decoupling capacitor S-parameter model.

17. The non-transitory computer readable medium of claim 16, wherein the combined S-parameter model is further determined by combining the second S-parameter model with one or more of the second decoupling capacitor S-parameter models.

* * * * *